United States Patent [19]
Yoh et al.

[11] Patent Number: 5,740,333
[45] Date of Patent: Apr. 14, 1998

[54] IMAGE PROCESSING METHOD AND IMAGE PROCESSING APPARATUS FOR CONVERTING AN INPUTTED COLOR IMAGE INTO A TWO-COLOR IMAGE

[75] Inventors: Anki Yoh, Tokyo; Kouichi Kamon, Yokohama; Masaaki Ito, Zama; Yoshiyuki Namizuka, Sagamihara; Hiroyuki Kawamoto, Kawasaki; Takeharu Tone, Yokohama, all of Japan

[73] Assignee: Ricoh Company, Ltd., Tokyo, Japan

[21] Appl. No.: 428,990

[22] Filed: Apr. 26, 1995

[30] Foreign Application Priority Data

Apr. 27, 1994 [JP] Japan .................. 6-089879

[51] Int. Cl.⁶ .............. C06F 15/00; H04N 1/46; G03F 3/08
[52] U.S. Cl. .............. 395/109; 358/529; 358/515; 358/518; 358/501; 358/537; 358/538; 382/167
[58] Field of Search .................. 358/500, 515, 358/516, 518, 501, 529, 532, 533, 536, 537, 538; 395/109; 382/167

[56] References Cited

U.S. PATENT DOCUMENTS

| | | |
|---|---|---|
| 4,467,348 | 8/1984 | Fujii et al. .................. 358/501 |
| 4,980,758 | 12/1990 | Matsunawa et al. .................. 358/515 |
| 5,220,417 | 6/1993 | Sugiura .................. 358/468 |
| 5,440,407 | 8/1995 | Overton .................. 358/447 |
| 5,493,424 | 2/1996 | Tomita et al. .................. 358/500 |
| 5,495,348 | 2/1996 | Sakai et al. .................. 358/501 |
| 5,532,825 | 7/1996 | Lim et al. .................. 358/296 |

FOREIGN PATENT DOCUMENTS 5-190266  8/1993  Japan .................. G06F 15/70

*Primary Examiner*—Edward L. Coles, Sr.
*Assistant Examiner*—Tia M. Harris
*Attorney, Agent, or Firm*—Lowe, Price, LeBlanc & Becker

[57] ABSTRACT

With the present invention, an inputted color image is separated to image signals for three colors of Red, Green and Blue, determination is made as to whether a remarked pixel is for a specified color or not according to the image signals for the separated three colors, brightness data for the inputted color image is detected, determination is made as to whether a remarked pixel is for a white color or a black color depending on the detected brightness data, a pixel determined as for a specified color is converted to a specified color, and a pixel determined as not for a specified color is converted to a white color or a black color according to a result of determination as to whether the remarked pixel is for a white color or a black color, so that a separation area for a specified color can clearly be defined.

16 Claims, 13 Drawing Sheets

FIG.5

| Equation(1) | Equation(2) | Equation(3) | Result of judgment | Reference |
|---|---|---|---|---|
| 1 | 1 | No relation | Red | 1: Established 0: Not established |
| 1 | 0 | No relation | Non-red | |
| 0 | No relation | 1 | Red | |
| 0 | No relation | 0 | Non-red | |

FIG.6

| Equation(4) | Equation(5) | Equation(6) | Result of judgment | Reference |
|---|---|---|---|---|
| 1 | 1 | No relation | Blue | 1: Established 0: Not established |
| 1 | 0 | No relation | Non-blue | |
| 0 | No relation | 1 | Blue | |
| 0 | No relation | 0 | Non-blue | |

FIG.7

| Equation for judgment | Result | Reference |
|---|---|---|
| $(2R+5G+B)/8 > K_{th}$ | White | $K_{th}$: Threshold value for black/white determination for brightness |
| $(2R+5G+B)/8 \leq K_{th}$ | Black | |

FIG.8A

|   | 1 | 2 | 3 | 4 | 5 |
|---|---|---|---|---|---|
| 1 | 11 | 12 | 13 | 14 | 15 |
| 2 | 21 | 22 | 23 | 24 | 25 |
| 3 | 31 | 32 | 33 | 34 | 35 |
| 4 | 41 | 42 | 43 | 44 | 45 |
| 5 | 51 | 52 | 53 | 54 | 55 |

FIG.8B

Horizontal  LP1 | 31 | 32 | 33 | 34     LP2 | 35 | 34 | 33 | 32

Vertical    LP3 | 13 | 23 | 33 | 43     LP4 | 53 | 43 | 33 | 23

Inclined    LP5 | 11 | 22 | 33 | 44     LP6 | 55 | 44 | 33 | 22

Inclined    LP7 | 15 | 24 | 33 | 42     LP8 | 51 | 42 | 33 | 24

FIG.9

| No | Pattern before correction | Processing for correction | Pattern after correction |
|----|---------------------------|---------------------------|--------------------------|
| 1 | C , C , [B] , W | B to C | C , C , [C] , W |
| 2 | B , B , [C] , W | C to B | B , B , [B] , W |
| 3 | W , B , [C] , W | C to B | W , B , [B] , W |
| 4 | B , C , [C] , W | C to B | B , C , [B] , W |
| 5 | W , C , [C] , B | C to B | W , C , [B] , B |
| 6 | B , B , [C] , B | C to B | B , B , [B] , B |
| 7 | W , B , [C] , B | C to B | W , B , [B] , B |

C : Color
B : Black
W : White

Letter in box : Remarked pixel

IMAGE PROCESSING METHOD AND IMAGE PROCESSING APPARATUS FOR CONVERTING AN INPUTTED COLOR IMAGE INTO A TWO-COLOR IMAGE

FIELD OF THE INVENTION

The present invention relates to an image processing method and image processing apparatus using the same having a digital image processing function for converting a color image to a two-color image consisting of a specified color and black, such as a copying machine, a facsimile machine, and a printer.

BACKGROUND OF THE INVENTION

A method of separating a color image into three colors of red, green, and blue and converting the color image into a red and black image depending on data for red and green colors among the three colors above, or into a blue and back image depending on data for blue and red colors of among the three colors has been employed in a red/black or blue/black two-color copying machine. The color separation method and a method for color displacement are disclosed in Japanese Patent Application No. 190266/1993. This method is characterized in that determination ranges for red, black, and white colors are set depending on data for red and green colors and a red and black two-color image is generated, or determination ranges for blue, black, and white colors are set depending on data for blue and red colors and a blue and black two-color image is generated. As for color displacement, a method is employed in which correction for color displacement is made pixel by pixel.

However, in the conventional type of color separation method, a region for color judgment is correlated to a region for judgment of white and black colors. Because of this feature, when a region for color judgment becomes larger, a region for judgment of white color becomes smaller. Correction of color displacement in the conventional technology assumes color displacement of 1 dot or less in its design stage, so that this technology can not be applied to correction of color displacement of 1 dot or more.

A detailed description is made below for the problem described above with reference to the related drawings. At first, description is made, with reference to FIGS. 16A and 16B, for the fact that, in the color separation method based on the conventional technology, as a region for color judgment is correlated to a region for judgment of white and black colors, when a region for color judgment becomes larger, a region for judgment of white color becomes smaller. As shown in FIG. 16A, in the conventional type of color separation method, red, black, and white colors are determined respectively according to levels of Red and Green, and it is assumed herein, for instance, that there are two points, point A and point B as shown in FIG. 16A, and point A is red while point B is white (This corresponds to a blank space). In order to accurately judge this arrangement, namely in order to accurately judge that point A in FIG. 16A is color data, if a threshold value is adjusted from X to Y as shown in FIG. 16B, as a result of this adjustment, point A is determined as red, but sometimes point B may be determined as black. This phenomenon occurs because, although point A is determined as color data, as a region for judgment of white and black is correlated to a region for color judgment, point B is correlated to point A, and point B is determined as black data. As understood from the above description, when a region for color judgment becomes larger, a region for judgment of white color becomes disadvantageously smaller.

Next, a description is made, with reference to FIGS. 17A to 17D, for the problem that a portion to be determined as a white section is determined as a black section and color displacement can not be corrected. FIG. 17A shows an image of a document comprising 4 dots for black for an image section, black, white for a texture section, and white. Now assumed herein is a case that color displacement occurs when the document image shown in FIG. 17A is read by an image reader and a color of a portion of the white texture section as shown in FIG. 17B changes to red. Herein it is assumed that, in order to correct the phenomenon of color displacement as described above, a reference pattern of "black, black, red, and white" is prepared and, when an image satisfying the conditions of the reference pattern is detected, red is corrected to white. However, in the conventional technology, as a region for judgment of white and black sections is correlated to a region for color judgment, white is determined as black as shown in FIG. 17C and the conditions of the reference pattern of "black, black, red, and white" described above are not satisfied. As a result, color displacement is not corrected, or namely a color image is outputted without the color displacement as shown in FIG. 17D being corrected (Refer to FIG. 17B). Thus, a portion to be recognized as a white portion is determined as a black portion, and effective correction for color displacement can not be executed.

SUMMARY OF THE INVENTION

It is an object of the present invention to provide an image processing apparatus and an image processing method using the same enablement making it possible to more clearly separate regions for each color and to more effectively correct color displacement.

With the image processing method and the image processing apparatus using the same according to the present invention, determination is made as to whether a remarked pixel is for a specified color or not and also as to whether the remarked pixel is for white or black color. A pixel determined as for a specified color is converted to a specified color, while a pixel determined as not for the specified color is converted to white or black color depending on a result of determination as to whether the remarked pixel is for white or black, so that a separation area for a specified color can clearly be defined and effective correction of color displacement can be realized.

Also, with the image processing method and image processing apparatus using the same according to the present invention, inputted color image is separated to image signals for the three colors of Red, Green, and Blue, determination is made depending on image signals for the separated three colors as to whether a remarked pixel is for a specified color or not, information for brightness of the inputted color image is detected, determination is made depending on the detected information for brightness as to whether the remarked pixel is for white or black color, the pixel is converted to the specified color when the pixel is for the specified color, and a pixel determined as not for the specified color is converted to white or black depending on a result of determination as to whether the remarked pixel is for white or black color, so that a region separated for a specified color can be made clearer and color displacement can be corrected more effectively.

Also, with the image processing method and image processing apparatus using the same according to the present invention, in order to define a range for detection of red, in addition to two correction values preset for red and a threshold value for green, quantities of light for red and green are used to provide three types of operational expression. By making use of combinations of the three operational expressions, whether a remarked pixel is for red or not can be determined. For this reason, it is possible to clearly differentiate a region for red from a region not for red, namely to accurately define a separated region for red.

Similarly, in order to define a range for detection of blue, in addition to two correction values preset for blue and a threshold value for red, quantities of lights for red and blue are used to provide three types of operational expressions. Whether an object pixel is blue or not can be determined from this combination.

For this reason, it is possible to accurately define a separated region for blue.

A white and black determinator provided separately from a color detector computes a brightness value from qualities of light for red, blue and green of a pixel determined as not for any color, and determines the pixel as for white when the brightness value is larger than a threshold value for brightness, and for black when the brightness value is smaller than the threshold value for brightness. For this reason, determination as to white and black can be executed in a stable condition.

A 5×5 matrix including an object pixel as a central pixel is prepared, and 8 linear patterns in each of the vertical, horizontal, and inclined directions are extracted from this matrix. For instance, a linear pattern consisting of 4 elements such as red, red, black, and white is extracted (the third pixel for black is determined as an object pixel), the linear pattern is compared to the preset reference pattern, and processing for correction between black and a color is executed for patterns identical to the reference pattern. For this reason, it is possible to detect and correct color displacement.

Also, by preparing seven types of reference patterns for each of 4 elements, in each of which an order of combination of black, white, red, and blue is different according to a result of determination as to whether a specified color is for a pattern of black, white, and red or for a pattern of black, white, and blue, it is possible to correct color displacement of up to 2 dots or color displacement between black and a pixel for black.

Other objects and features of this invention will become understood from the following description with reference to the accompanying drawings.

BRIEF DESCRIPTION OF THE DRAWINGS

FIG. 5 is an explanatory view for explanation of a determination method when a color regarded as red is detected from a color image in the red/black mode;

FIG. 6 is an explanatory view for explanation of a determination method when a color regarded as blue for a color image in the blue/black mode;

FIG. 7 is an explanatory view showing a determination criteria in the color detector according to the present invention for execution of determination of white and black to a pixel determined as not for a color;

FIGS. 8A and 8B are explanatory views showing an example of configuration of a 5×5 matrix according to the present invention;

FIG. 9 is an explanatory view showing an example of configuration of linear patterns extracted in each direction from the matrix shown in FIGS. 8A and 8B;

DESCRIPTION OF THE PREFERRED EMBODIMENTS

A description is made hereinafter for embodiments of an image processing method and an image processing apparatus according to the present invention with reference to the related drawings.

Figure 1:
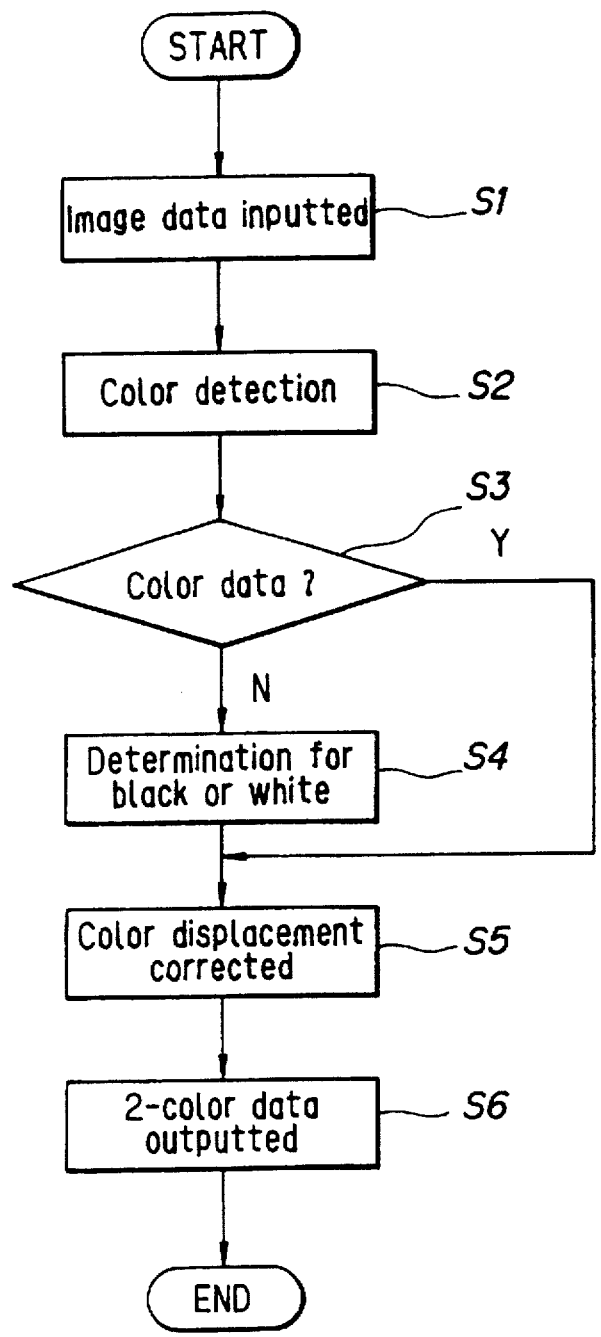
FIG. 1 is a flow chart showing operations in the image processing method according to the present invention.
Figure 2:
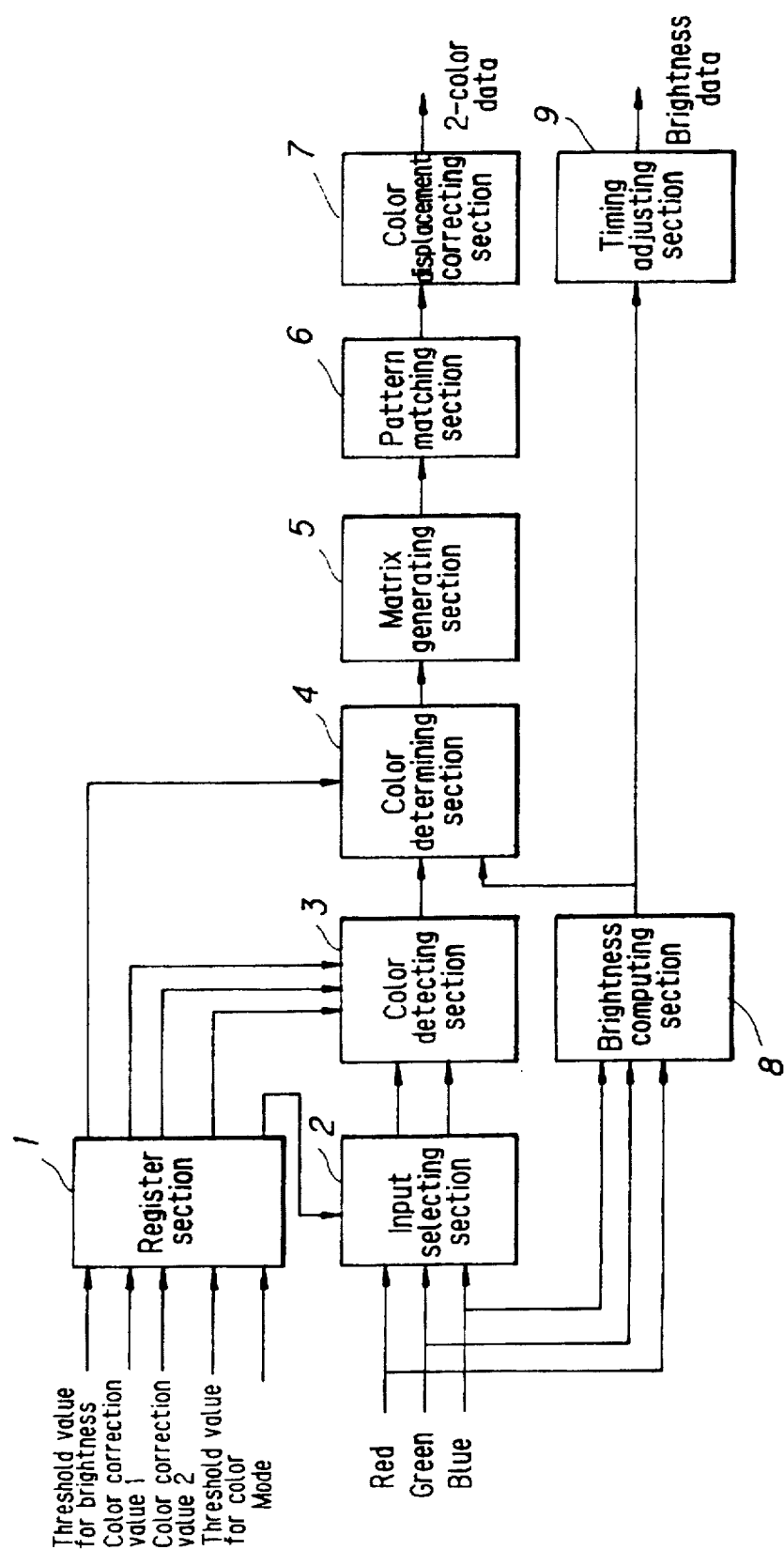
FIG. 2 is a block diagram showing detailed configuration of the image processing apparatus according to the present invention.
Figure 3:
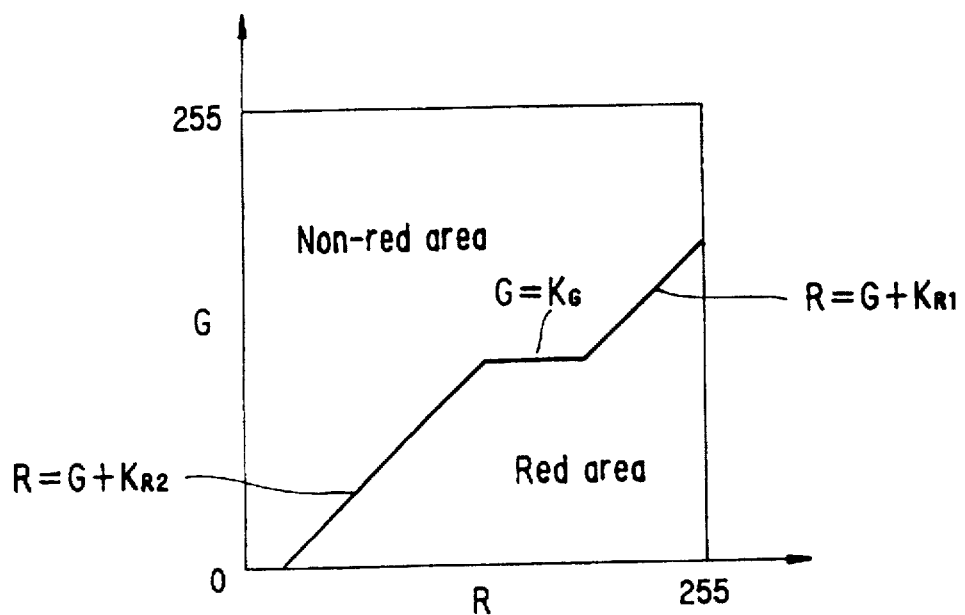
FIG. 3 is an explanatory view for explanation of a separated region for red in the red/black mode.
Figure 4:
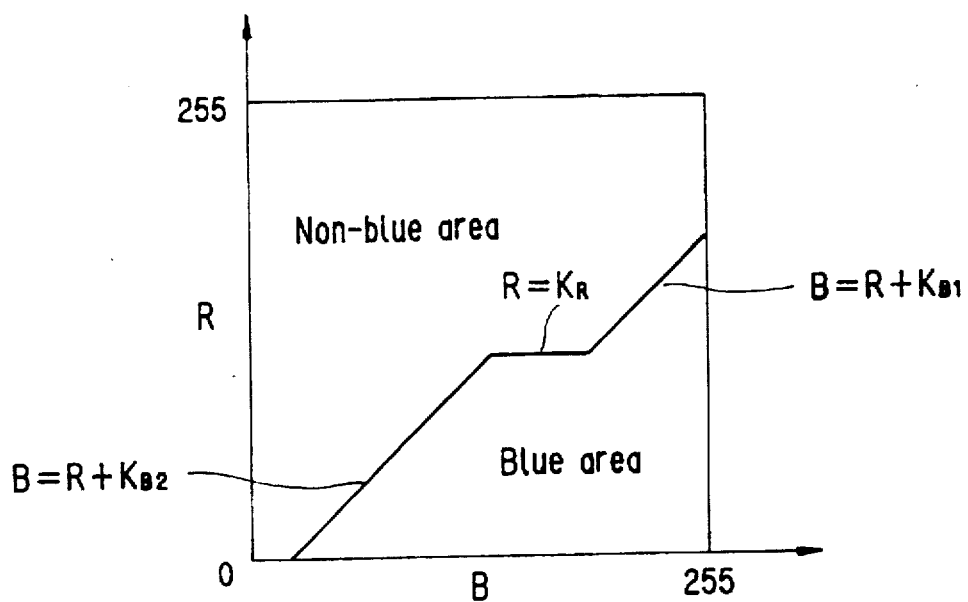
FIG. 4 is an explanatory view for explanation of a separated region for blue in the blue/black mode.
Figure 10:
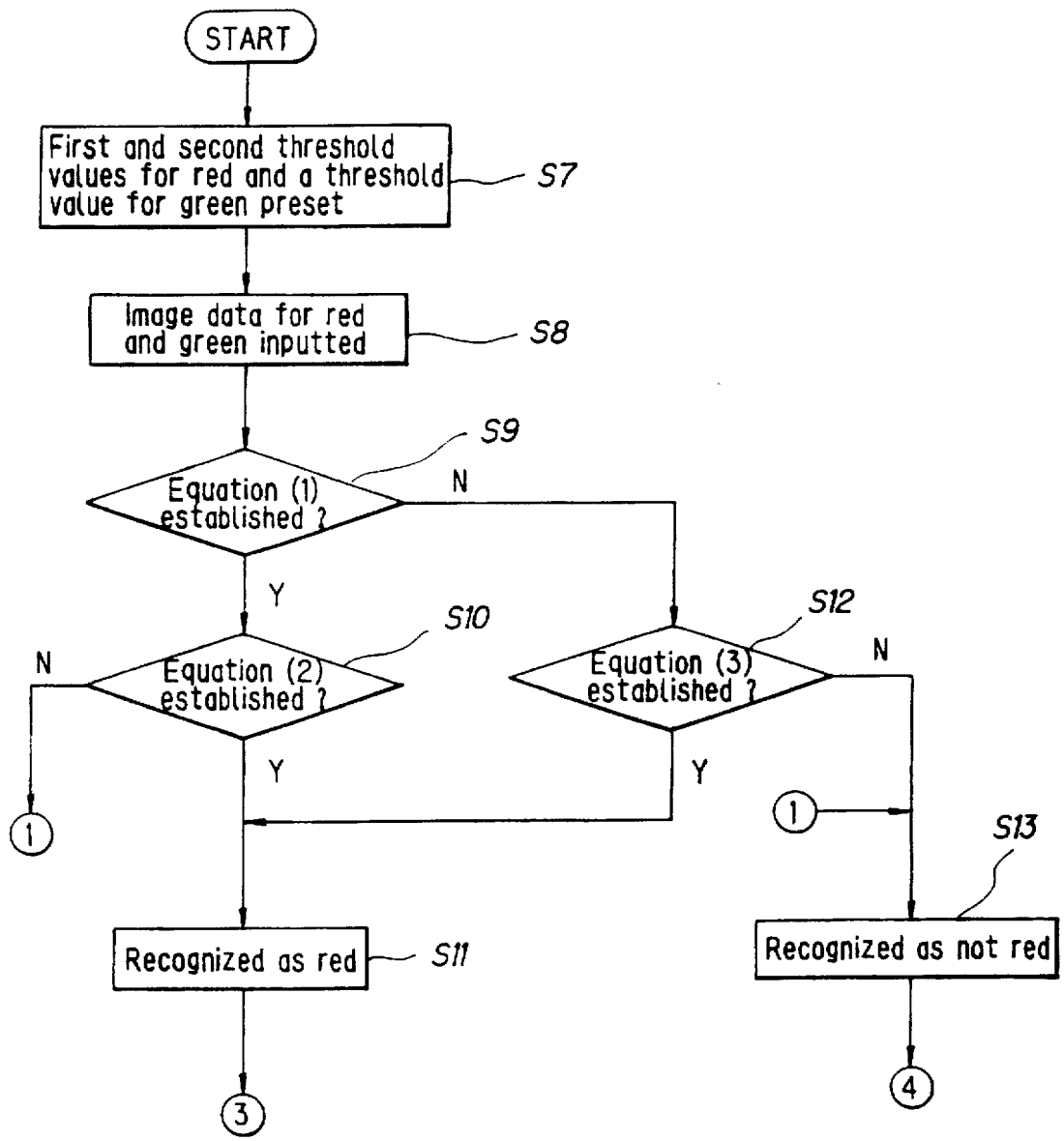
FIG. 10 is a flow chart showing processing operations in the red/black mode according to the present embodiment.

FIG. 1 is a flow chart showing operations in the image processing method according to the present invention, and FIG. 2 is a block diagram showing detailed configuration of the image processing apparatus according to the present invention. Also FIG. 3 is an explanatory view for explanation of separation area for red in the red/black mode, FIG. 4 is an explanatory view for explanation of a separation area for blue in the blue/black mode.

As shown in FIG. 1, the image processing method according to the present invention features the following three steps, namely step S2 of detecting colors of image data, step S4 of determining as to whether a detected color is the one belonging to white or black color, and step S5 of obtaining two-color image data subjected to color displacement correction depending on data determined as for a color and white and black color data.

A detailed description is made hereinafter for the flow chart in FIG. 1.

At first, image data is inputted (S1), and a processing for detecting a color is executed to the inputted image data (S2).

In the processing for color detecting, a color image is separated into three colors of red, green, and blue. And judgment is made as to each pixel depending on quantities of light for red and green when a specified color is red (namely in the red/black mode) and for blue and red when a specified color is blue (namely in the blue/black mode). A range of determining colors in the red/black mode or the blue/black mode can be adjusted according to a correction value or threshold value. A region of color separation in the red/black mode and the blue/black mode is shown in FIG. 3 and FIG. 4 respectively.

Herein, description is made for a means for detecting a color regarded as red from a color image in the red/black mode.

In order to define a range for detecting red, a first and a second correction values (correction value [1], correction value [2]) for red and a threshold value to green are preset. Light quantity signals for red and green are taken out from light quantity signals for three colors of red, green, and blue in a separated color image. These light quantity signals are computed according to expressions (1) to (3) as shown below, and determination is made as to whether the color is red or not according to a result obtained thereby. A concrete method for determination is shown in FIG. 5. A result obtained from three expressions is also taken into consideration in the determination. Namely, when the expression (1) and the expression (3) are satisfied and at the same time the expression (2) is not satisfied, an object pixel (a remarked pixel) is determined as for red.

$$G > K_G \quad (1)$$

$$R > (G + K_{R1}) \quad (2)$$

$$R > (G + K_{R2}) \quad (3)$$

(Wherein, G is a light quantity signal of green, R is a light quantity signal for red, $K_G$ is a threshold value for green, $K_{R1}$ is a correction value [1] for red (the first correction value), $K_{R2}$ is a correction value [2] for red (the second correction value)).

Next, a description is made for a means for detecting color regarded as blue from a color image in the blue/black mode. At first, in order to define a range for detecting blue, threshold values for a first and a second correction values (a correction value [1] and a correction value [2]) for blue are preset.

Light quantity signals for blue and red are taken out from the light quantity signals for three colors of red, green, and blue in a separated color image. These light quantity signals are computed depending on the expressions (4) to (6) as described below, and determination is made as to whether the color is blue or not from a result obtained thereby. A concrete method of determination is made as shown in FIG. 6 and like in a case of red by taking into considerations a result obtained from the three expressions. With this operation, a result of determination as to whether an object pixel is for blue or not is obtained.

$$R > K_R \quad (4)$$

$$B > (G + K_{B1}) \quad (5)$$

$$B > (G + K_{B2}) \quad (6)$$

(Wherein, B is a light quantity signal for blue, R is a light quantity signal for red, $K_R$ is a threshold value for red, $K_{B1}$ is a correction value [1] for blue, $K_{B2}$ is a correction value [2] for blue.)

After a processing for color detecting in step S2 described above is finished, determination is made as to whether the data detected in the processing for color detecting is color data or not (S3), and if the data is color data, then a processing for determination of white and black colors is executed (S4). Namely, to a pixel determined as not for red in the red/black mode, or as not for blue in the blue/black mode, in the processing for color detection, determination is made as to whether the color is white or black depending on a brightness value of that pixel. The computing expression employed for this determination is as shown in FIG. 7, and is executed based on a threshold value $K_{th}$ for determination of white and black as for brightness.

After the processing for determination of white and black is finished, a processing for color displacement correction is executed (S5). Namely, the processing for converting from a color image to two-color pixel for red/black, or blue/black can be realized according to the processing for color detecting and for determination of white and black described above. There is a possibility, however, that color displacement is generated in a converted two-color image due to non-uniform illumination in a reading system, or positional displacement of lines in a CCD (Charge Coupled Device) or the like. This color displacement is apt to be generated especially in an edge section of an image. In contrast to this, in the present invention, as for a pixel already subjected to a color recognition, pixels around the object pixel are checked, and the degree of color displacement is determined for correction thereof.

In the method for correction described above, a 5×5 matrix is prepared as shown in FIG. 8A with a total of 25 pixels, concretely an object pixel as a central pixel and two pixels located before and behind the central pixel respectively on the same, and an object pixel and two pixels in each row located above and below the central pixel at the same position respectively on the two lines before and behind the line on which the central pixel is located in the main scanning direction, and totally eight linear patterns each comprising 4 elements including the object pixel as a this one are extracted in the vertical, horizontal, and diagonal directions as shown in FIG. 8B.

As for seven correction patterns preset by assuming conditions of correction, in the eight patterns extracted described above, each pattern thereof is compared to a reference pattern (Two groups of No. 1 to No. 5 and No. 1 to No. 7 as shown in FIG. 9). If there is even one pattern among the eight patterns identical to one of the reference patterns, it is judged that color displacement has occurred, and correction for the object pixel is executed depending on a rule for correction corresponding to the reference pattern. As a result of comparison therebetween, correction is not executed to a pixel at which color displacement has not occurred, and a result of determination according to processing described above is outputted as it is. Namely, if there is even one pattern among the eight patterns identical to a reference pattern and an object pixel is for a specified color, the specified color is corrected to black, and if the color is black, it is corrected to a specified color. A rule for correction processing in this case is shown in FIG. 9.

After the collection processing for color displacement described above is finished, two-color data is outputted (S6), and the processing sequence is terminated.

Next, a description is made for configuration of the image processing apparatus according to the present invention with reference to FIG. 2.

The present invention comprises: a register section 1 for storing therein a threshold value for inputted a brightness value, color correction values [1] and [2], a color threshold value, and each data for mode signals or the like; a input selecting section 2 for selecting a specified color from red, green, and blue; a color detecting section 3 for making a decision as to whether a pixel is determined as for a color or not according to an outputting signal from the input selecting section 2; a color determining section 4 for determining as for a color, black and white for each pixel; a matrix generating section 5; a pattern matching section 6 for comparing a pattern from the matrix generating section 5 to a reference pattern; a color displacement correction section 7 for correcting an object pixel for a pattern identical to a reference pattern; a brightness computing section 8 for computing a brightness value for each color for each pixel; and a timing adjusting section 9.

Next, a description is made for functions in each section.

The register section 1 comprises a register for storing a correction value for color detecting and determining as for colors, characteristics data for a threshold value or the like. When in the red/black mode, a correction value [1] for red and a correction value [2] for detecting red, and a threshold value for green are preset from an external section, and when in the blue/black mode, a correction value [1] for blue and a correction value [2] for detecting blue, and a threshold value for red are also preset from outside, then storage thereof is executed. In addition to it, data for mode of color separation, and a threshold value for brightness for determination of white and black is also preset.

The input selecting section 2 is used for selecting a data signal inputted to the color detecting section 3 described later. Two-signal data among 8 bits data for three light quantities of red, green, and blue in color image inputted according to data for mode set in the register section 1 are selected and outputted to the color detecting section 3. When in the red/black mode, data for red and green is selected and outputted, and when in the blue/black mode, data for blue and red is selected and outputted.

The color detecting section 3 has a function for deciding whether a pixel is determined as for a color or not depending on inputted two-color data. A correction value [1] and a correction value [2] for a specified color from the register section 1, data for a threshold value, and image data inputted from the input selecting section 2 are detected whether it is for a specified color or not for each pixel depending on the detecting method described above in the color detecting section 3. A result of color detecting is outputted to the color determining section 4.

The color determining section 4 reads a threshold value for brightness from the register section 1, and executes processing for determination for a color, black and white for each pixel according to data given from the color detecting section 3 and brightness computing section 8, and a result of that processing is outputted to the matrix generating section 5.

The matrix generating section 5 fetches pixels for lines according to a result of color determination in the color determining section 4, fetches 5 pixels from each line, prepares a 5×5 matrix, and among them, extracts linear patterns consisting of 4 elements including an object element as a third element in each of the vertical, horizontal, and inclined directions (Eight patterns shown in FIG. 8B). The eight patterns are outputted to the pattern matching section 6. Also, the pattern matching section 6 compares a preset reference pattern to each pattern of the eight patterns from the matrix generating section 5, and a result of comparison therebetween (identical/non-identical) is transmitted to the color displacement correction section 7.

The color displacement correction section 7 has a function for determining whether correction for color displacement is to be executed or not depending on a result in the pattern matching section 6, and as for a pattern identical to a reference pattern, a processing for correction to the object pixel is executed according to correction shown in FIG. 9. Image data after subjected to a processing for correction is outputted to an external section. As for a pattern not identical to a reference pattern, a processing for correction to an object pixel is not executed, and the pixel is outputted as it is.

The brightness computing section 8 computes a brightness value for each pixel in the image data composed of 8 bits for red, green, and blue of an inputted color image, and a result of the computing is outputted to the color determining section 4 and timing adjusting section 9. The color determining section 4 reads a threshold value of brightness from the register section 1, and processing for determining as for color, black and white for each pixel depending on data from the color detecting section 3 and the brightness computing section 8 is executed. A result of this color determination is outputted to the matrix generating section 5. Furthermore, the timing adjusting section 9 adjusts a timing for the inputted data from the brightness computing section 8 while a signal is outputted to outside in order to adjust delay in output from the color displacement correction section 7.

Next, a description is made for operations in embodiments according to configuration in FIG. 2. A two-color copying machine starts operations in two modes for two colors of red/black and two colors of blue/black. The mode setting is automatically executed in accordance with types of provided color toner. Various types of characteristics value are written in the register section 1. In contrast, a color image is separated into three colors of red, green, and blue for each pixel, and data indicating quantities of light for three colors is inputted into the input selecting section 2 and brightness computing section 8 as data for 256 types of tone. The input selecting section 2 refers to mode data read from the register section 1, selects red and green for the red/black mode, selects blue and red for the blue/black mode, and outputs them respectively to the color detecting section 3.

In the color detecting section 3, processing for detecting as to whether inputted image data is for a specified color or not is executed depending on each data for correction values [1] and [2], and a threshold value from the register section 1, and a result thereof is outputted to the color determining section 4. Also, in the brightness computing section 8, image data composed of 8 bits for red, green and blue in a color image is received, a brightness value for each pixel is computed, and a result thereof is outputted to the color determining section 4 and the timing adjusting section 9. In the color determining section 4, a threshold value for brightness from the register section 1 is read, processing for determining as for a color, black and white for each pixel is executed depending on data given from the color detecting section 3 and the brightness computing section 8, and a result thereof is outputted to the matrix generating section 5.

In the matrix generating section 5, a result of color determination in the color determining section 4 is received, a 5×5 matrix is prepared as described above for an object pixel, and eight linear patterns among them is extracted. The eight patterns are transmitted to the pattern matching section 6, and each thereof is compared to one preset group of a reference pattern one by one from two groups of reference patterns which are changeable. A result of the comparison therebetween (identical/non-identical data) is outputted to the color displacement correction section 7.

In the color displacement correction section 7, determination is made as to whether correction for color displacement is to be executed or not depending on a result in the pattern matching section 6. As for a pattern identical to a reference pattern, a processing for correction for an object pixel is executed as shown in FIG. 9. Pixel data corrected is outputted to an external circuit (or a device) which is not shown in figure. In contrast, as for the pattern not identical to a reference pattern, processing for correction for an object pixel is not executed, and the pixel is outputted without being corrected. Also, in order to adjust delay in each outputting from the timing adjusting section 9 and the color displacement correction section 7, the inputted data from the brightness computing section 8 is outputted to outside with timing being adjusted.

Concrete description is made for the operations described above with reference to the flow charts shown in FIG. 10 to FIG. 15. At first, in FIG. 10, the first and the second correction value for red, and a threshold value for green are preset (S7), and image data for red and green are inputted (S8). Then judgment is made as to whether the expression (1) described above is satisfied or not (S9), and if it is judged that the expression (1) is satisfied, next, judgment is made as to whether the expression (2) described above is satisfied or not (S10), then if it is judged that the expression (2) is satisfied, the data is determined as for red (S11). On the contrary, if it is judged that the expression (2) is not satisfied, the data is determined as not for red (S13). Also, in step S9 described above, if it is judged that the expression (1) is not satisfied, then judgment is made as to whether the expression (3) is satisfied or not (S12), and if it is judged that the expression (3) is satisfied, operation goes to step S11 and the data is determined as for red. On the contrary, if it is judged that the expression (3) is not satisfied, then operation goes to step S13 and the data is determined as not for red (S13).

Figure 11:
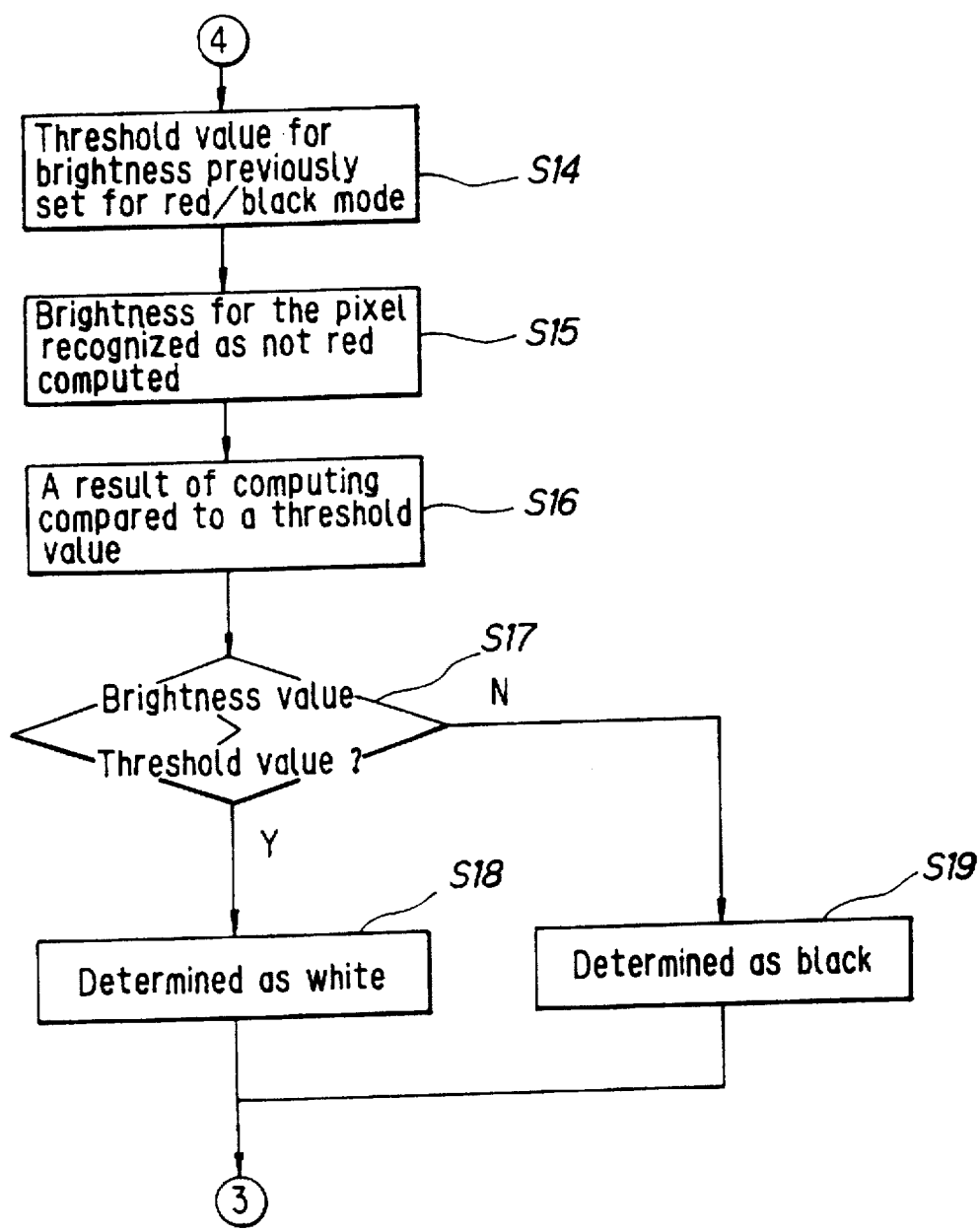
FIG. 11 is a flow chart showing processing operations in the red/black mode according to the present embodiment.

Then in FIG. 11, after the data is determined as not for red in step S13 described above, a threshold value for brightness in the red/black mode is preset (S14), and a brightness value of the pixel determined as not for red is computed (S15). Then a result of computing is compared to the threshold value (S16), and judgment is made as to whether the brightness value is larger than the threshold value thereof or not, namely, it is judged as to whether the expression below is satisfied or not (S17):

Brightness value>Threshold value

As a result, if it is judged that the expression of "brightness value>threshold value" is satisfied, it is determined as for white (S18), and if it is judged that "brightness value>threshold value" is not satisfied, then the pixel is determined as for black (S19).

Figure 12:
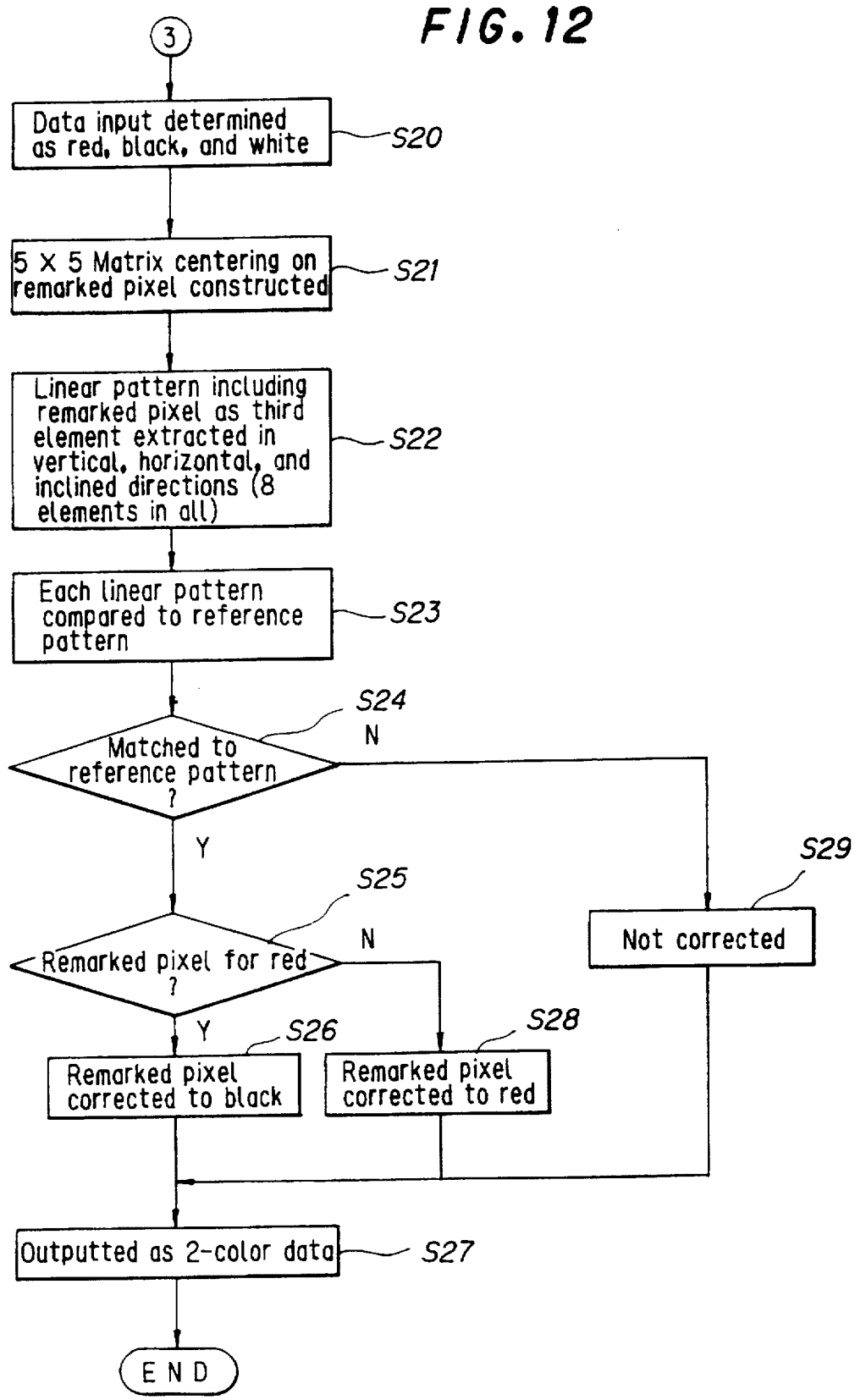
FIG. 12 is a flow chart showing processing operations in the red/black mode according to the present embodiment.

Next, in FIG. 12, after processing in step S11, step S18 or step S19 as described above is finished, data determined as for red, black, and white described above is inputted (S20), and a 5×5 matrix including a remarked pixel as a central pixel is composed (S21). Then a linear pattern comprising a remarked pixel as the third element in each of the vertical, horizontal, and inclined directions is extracted (a total of 8 patterns) (S22), and each linear pattern is compared to a reference pattern (S23). Then judgment is made as to whether each linear pattern is identical to a reference pattern or not (S24), and if it is judged that the two types of data are identical to each other, then judgment is made as to whether a remarked pixel is for red or not (S25), and if it is judged as for red, the remarked pixel is corrected to black (S26), and is outputted as two-color data (S27).

Also, in step S25, if it is judged that a remarked pixel is not for red, the remarked pixel is corrected to red (S28), and is outputted as two-color data. Furthermore, in step S24, if it is determined that each linear pattern is not identical to a reference pattern, it is outputted as two-color data without any correction executed thereto (S29).

Figure 13:
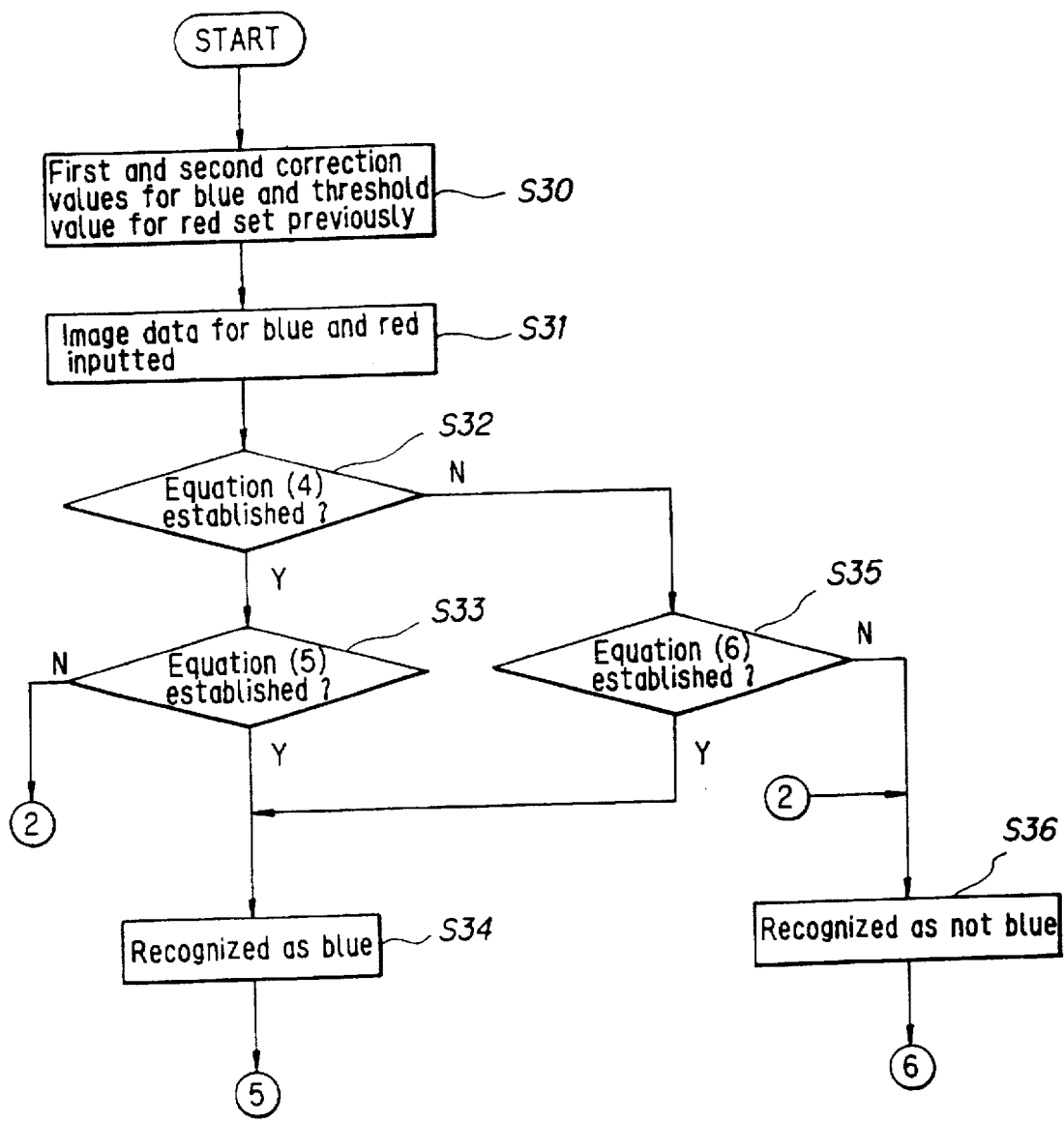
FIG. 13 is a flow chart showing processing operations for the blue/black mode according to the present embodiment.
Figure 14:
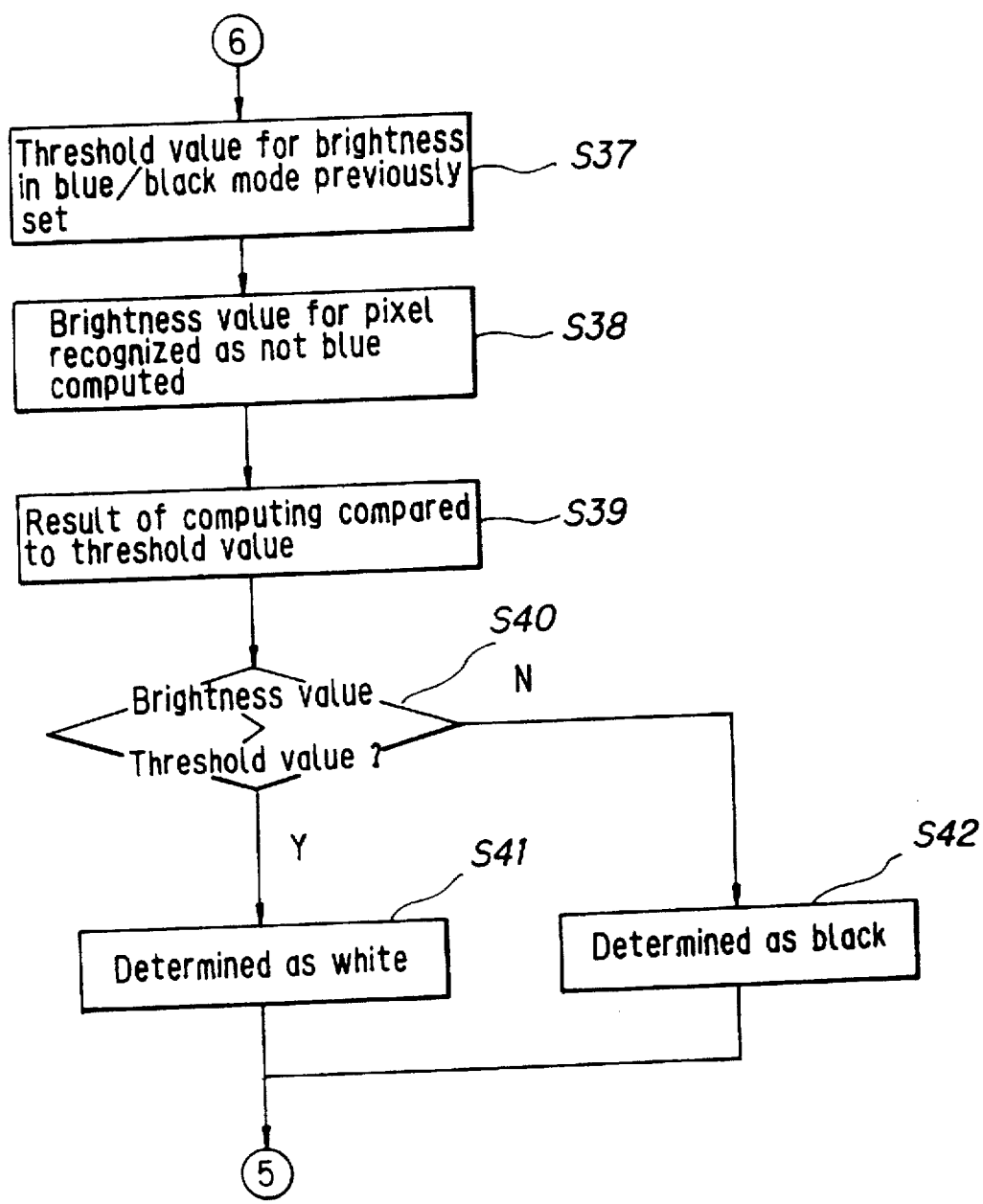
FIG. 14 is a flow chart showing processing operations in the blue/black mode according to the present embodiment.

Also in FIG. 13, a first and a second correction value for blue, and a threshold value for red are preset (S30), and image data for blue and red is inputted (S31). Then judgment is made as to whether the expression (4) described above is satisfied or not (S32), and if it is judged that the expression (4) is satisfied, then judgment is made as to whether the expression (5) described above is satisfied or not (S33), and if it is judged that the expression (5) is satisfied, then it is determined as for blue (S34). On the contrary, if it is judged that the expression (5) is not satisfied, the data is determined as not for blue (S36). Also, in step S32 described above, if it is judged that the expression (4) is not satisfied, then judgment is made as to whether the expression (6) described above is satisfied or not (S35), and if it is judged that the expression (6) is satisfied, operation goes to step S34 and it is determined as for blue. On the contrary, if it is judged that the expression (6) is not satisfied, operation goes to step S36 and it is determined as not for blue.

Next, in FIG. 13, after it is determined that the data is as not for blue in step S36 described above, a threshold value for brightness in the blue/black mode is preset (S37), and a brightness value for a pixel determined as not for blue is computed (S38). Then, a result of computing is compared to a threshold value (S39), and judgment is made as to whether the brightness value is larger than the threshold value or not, namely it is judged whether the expression described below is satisfied or not (S40):

Brightness value>Threshold value

As a result, if it is judged that the expression "brightness value>threshold value" is satisfied, it is determined as for white (S41), and if it is judged that the expression of "brightness value>threshold value" is not satisfied, it is determined as for black (S42).

Figure 15:
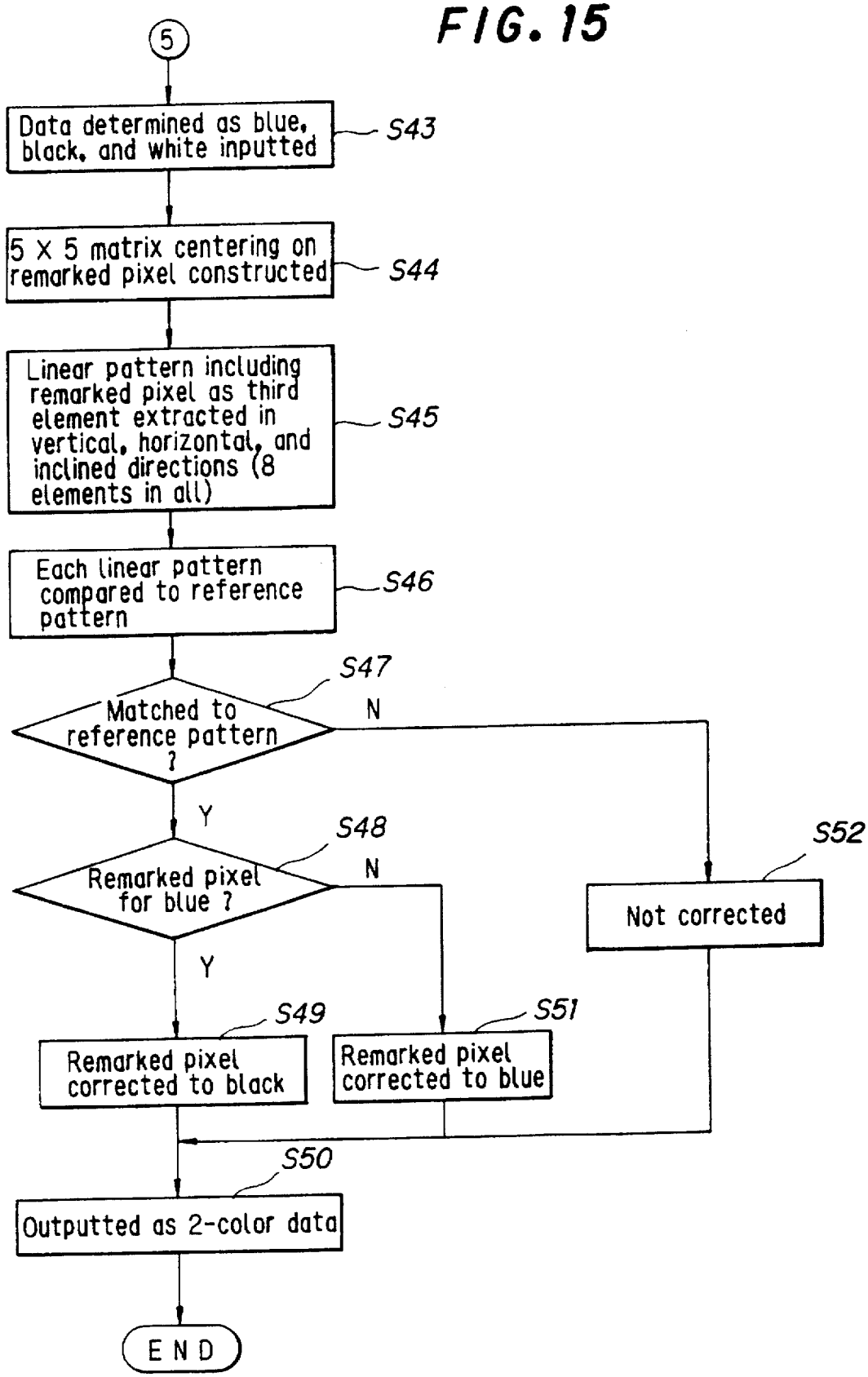
FIG. 15 is a flow chart showing processing operations in the blue/black mode according to the present embodiment.
Figure 16A:
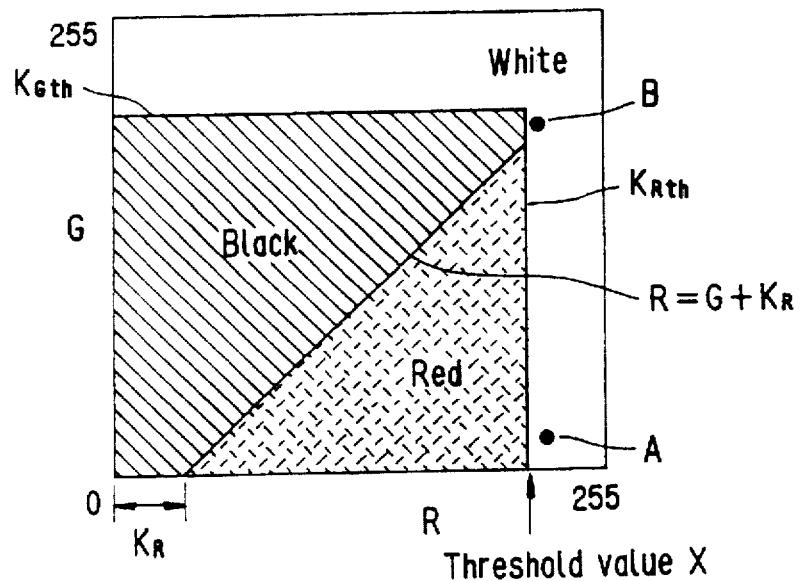
FIGS. 16A and 16B are explanatory views showing an example of operations in the conventional technology.
Figure 16B:
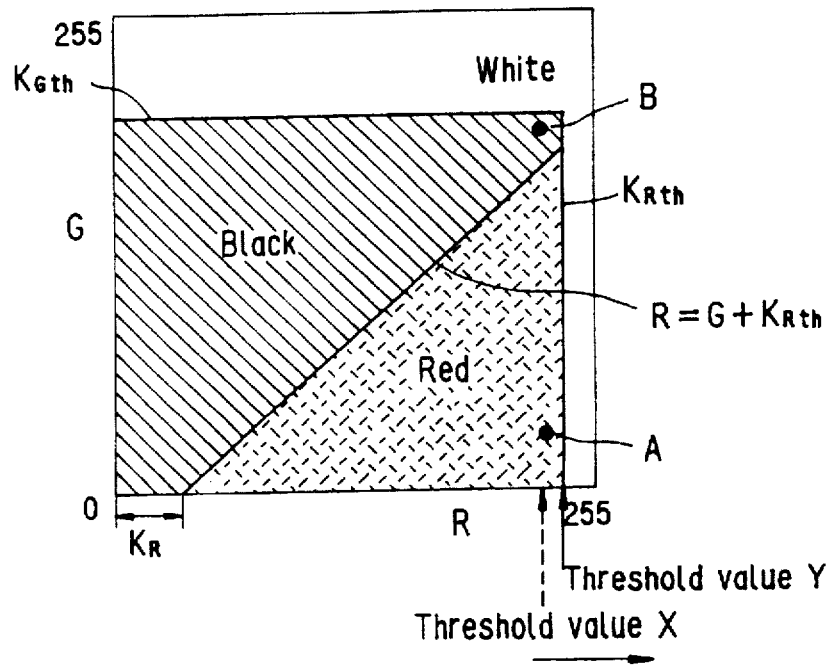
Figure 17A:
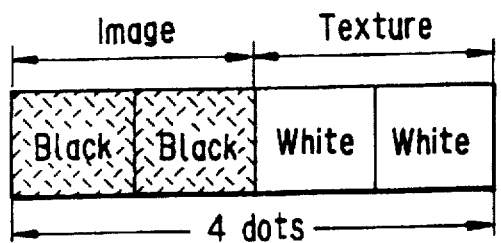
FIGS. 17A to 17D are explanatory views showing an example of operations in the conventional technology.
Figure 17B:
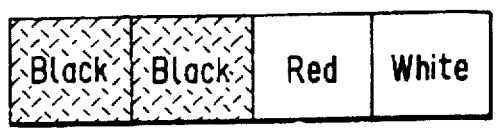
Figure 17C:
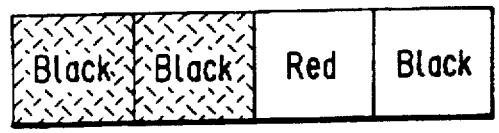
Figure 17D:

Next, in FIG. 15, after processing in step S34 or step S41 or step S42 is finished, data determined as for blue, black, and white described above is inputted (S43), and a 5×5 matrix including a remarked pixel as a central pixel is composed (S44). Then a linear pattern comprising a remarked pixel as the third element in each of the vertical, horizontal, and inclined directions is extracted (a total of 8 patterns) (S45), and each linear pattern is compared to a reference pattern (S46). Then, judgment is made as to whether each pattern is identical to a reference pattern or not (S47), and if it is judged that the two patterns are identical to each other, then judgment is made as to whether a remarked pixel is for blue or not (S48), and if it is judged as for blue, the remarked pixel is corrected to black (S49), and is outputted as two-color data (S50). Also in step S48, if it is judged that a remarked pixel is not for blue, the remarked pixel is corrected to blue (S51), and is outputted as two-color data. Furthermore in step S47, if it is judged that each linear pattern is not identical to a reference pattern, it is outputted as two-color data without any correction executed thereto (S52).

As described above, with the image processing method and the image processing apparatus according to the present invention, determination is made as to whether a remarked pixel is for a specified color or not, and also as to whether a remarked pixel is for white color or black color, a pixel determined as for a specified color is converted to the specified color, a pixel determined as not for a specified color is converted to white color or black color depending on a result of determination as to whether the remarked pixel is for white color or black color, so that a region separated for a specified color can be made more clearly and color displacement can be corrected more effectively.

Also, with the image processing method and the image processing apparatus according to the present invention, an inputted color image is separated into image signals for three colors of Red, Green, and Blue, and it is determined whether a remarked pixel is for a specified color or not depending on the separated three-color image signal, then brightness data for inputted color image is detected and it is determined whether the remarked pixel is for white or black depending on the detected brightness information, then a pixel determined as for a specified color is converted to the specified color, a pixel determined as not for a specified color is converted to white color or black color depending on a result of determination as to whether the remarked pixel is white color or black color, so that an area separated for a specified color can be made more clearly and color displacement can be corrected more effectively.

Also, with the image processing method and the image processing apparatus according to the present invention, if a specified color is red, a threshold value for green and a first and a second correction values for red are set for the threshold value, and an area of red is discriminated from an area of non-red, so that color displacement of 1 dot or more can accurately be corrected.

Similarly, if a specified color is blue, a threshold value for red and a first and a second correction values for blue are set as for the threshold value, and an area of blue is discriminated from an area of non-blue, so that an area of blue can accurately be defined and color displacement of 1 dot or more can accurately be corrected.

Also as for a pixel determined as not for a color, it is determined as for white and black depending on brightness computed according to a level of red, green, and blue for that pixel, for this reason, determination as to white and black can be executed in a stable condition.

Furthermore, a matrix including an object pixel as a central pixel is prepared and pattern matching is processed, so that it is possible to detect and correct color displacement.

In this case, combinations of reference patterns comprise four colors such as white, black, red, and blue, and five types of combinations are prepared, so that it is possible to correct color displacement of 2 dots, and in addition, seven types of combinations are prepared, so that it is possible to correct color displacement between black and a pixel for black.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus for separating a color image into three colors of red, green, and blue and converting said color image to a 2-color image including red and black as specified colors depending on a quality of light for each of the three colors above and outputting the converted color image producing a visible 2-color image, wherein first and second correction values for red and a threshold value for green are previously set, said image processing apparatus having a function for computing the following expressions in relation to each pixel constituting said color image;

Quantity of light for green>Threshold value for green (1)

Quantity of light for red>(Quantity of light for green+First correction value for red) (2)

Quantity of light for red>(Quantity of light for green+Second correction value for red) (3)

and also having a color detector for recognizing red for a pixel at which said expression (1) and expression (2) are satisfied or said expression (1) is not satisfied but said expression (3) is satisfied and also recognizing other pixels as not for red.

2. An image processing apparatus according to claim 1, comprising a white and black determinator for computing, when said color detector recognized a pixel as for a color different from said specified color, a brightness value for the pixel and recognizing the pixel as for white when the computed value exceeds a preset threshold value or as for black in other cases.

3. An image processing apparatus according to claim 1, comprising a color displacement corrector for organizing, for each pixel constituting said color image, a 5×5 matrix with a color recognized for the pixel centering on the object pixel, extracting a plurality of linear patterns each comprising 4 elements and including the central pixel as a third pixel in each of the vertical, horizontal, and diagonal directions, comparing the linear patterns to a plurality of reference patterns previously set, and correcting a color of the pixel to black when there is any matching pattern and at the same time said object pixel is for a specified color, or to a specified color when there is any matching pattern and said object pixel is for black.

4. An image processing apparatus according to claim 3, wherein an order of a first element to a fourth element in said reference pattern when said specified color is red is any of (red, red, black, white), (black, black, red, white), (white, black, red, white), (black, red, red, white), or (white, red, red, black) and also an order of a first element to a fourth element in said reference pattern when said specified color is blue is any of (blue, blue, black, white), (black, black, blue, white), (white, black, blue, white), (black, blue, blue, white) or (white, blue, blue, black).

5. An image processing apparatus according to claim 3, wherein an order of a first element to a fourth element in said reference pattern when said specified color is red is any of (red, red, black, white), (black, black, red, white), (white, black, red, white), (black, red, red, white), (white, red, red, black) (black, black, red, black) or (white, black, red, black) and also an order of a first element to a fourth element in said reference pattern when said specified color is blue is any of (blue, blue, black, white), (black, black, blue, white), (white, black, blue, white), (black, blue, blue, white), (white, blue, blue, black), (black, black, blue, black), or (white, black, blue, black).

6. An image processing apparatus for separating a color image into three colors of red, green, and blue and converting said color image to a 2-color image including blue and black as specified colors and outputting the converted color image producing a visible 2-color image, wherein first and second correction values for blue and a threshold value for red are previously set, said image processing apparatus having a function for computing the following expressions to each pixel constituting said color image;

Quantity of light for red>Threshold value for red (4)

Quantity of light for blue>(Quantity of light for red+First correction value for blue) (5)

Quantity of light for blue>(Quantity of light for red+Second correction value for blue) (6)

and also having a color detector for recognizing blue for a pixel at which said expression (4) and said expression (5) are satisfied, or when said expression (4) is not satisfied and said expression (6) is satisfied and recognizing other pixels as not for blue.

7. An image processing apparatus according to claim 6, comprising a white and black determinator for computing, when said color detector recognized a pixel as for a color different from said specified color, a brightness value for the pixel and recognizing the pixel as for white when the computed value exceeds a preset threshold value or as for black in other cases.

8. An image processing apparatus according to claim 6, comprising a color displacement corrector for organizing, for each pixel constituting said color image, a 5×5 matrix with a color recognized for the pixel centering on the object pixel, extracting a plurality of linear patterns each comprising 4 elements and including the central pixel as a third pixel in each of the vertical, horizontal, and diagonal directions, comparing the linear patterns to a plurality of reference patterns previously set, and correcting a color of the pixel to black when there is any matching pattern and at the same time said object pixel is for a specified color, or to a specified color when there is any matching pattern and said object pixel is for black.

9. An image processing apparatus according to claim 8, wherein an order of a first element to a fourth element in said reference pattern when said specified color is red is any of (red, red, black, white), (black, black, red, white), (white, black, red, white), (black, red, red, white), or (white, red, red, black) and also an order of a first element to a fourth element in said reference pattern when said specified color is blue is any of (blue, blue, black, white), (black, black, blue, white), (white, black, blue, white), (black, blue, blue, white) or (white, blue, blue, black).

10. An image processing apparatus according to claim 8, wherein an order of a first element to a fourth element in said reference pattern when said specified color is red is any of (red, red, black, white), (black, black, red, white), (white, black, red, white), (black, red, red, white), (white, red, red, black) (black, black, red, black) or (white, black, red, black) and also an order of a first element to a fourth element in said reference pattern when said specified color is blue is any of (blue, blue, black, white), (black, black, blue, white), (white, black, blue, white), (black, blue, blue, white), (white, blue, blue, black), (black, black, blue, black), or (white, black, blue, black).

11. An image processing method for converting an inputted color image consisting of a plurality of pixels to a 2-color image consisting of a black color and a specified color, comprising the steps of:

determining whether an object pixel is for said specified color and, if said object pixel has been determined not to be for said specified color, determining whether said object pixel is for white or black;

converting data for said object pixel to represent the specified color, black or white in accordance with the results of said determining step;

arranging data representing converted input pixels of said color image, including said object pixel, into a matrix;

comparing at least one portion of the matrix, which includes the converted data for said object pixel, with at least one reference pattern;

obtaining resultant pixel data by changing the object pixel data in response to a match in said comparing step but keeping the object pixel data unchanged in the absence of a match, wherein said step of changing comprises converting the object pixel data to represent color if said determining step resulted in a non color determination and to represent black if said determining step resulted in a color determination; and outputting said resultant pixel data.

12. An image processing method as recited in claim 11, wherein said comparing step comprises comparing said portion of the matrix with a plurality of reference patterns and said step of changing object pixel data is performed in response to a match with any of said plurality of reference patterns.

13. An image processing method as recited in claim 12, wherein said comparing step is applied to a plurality of portions of said matrix, each portion including said object pixel data.

14. An image processing method as recited in claim 11, wherein said determining step comprises:

separating said inputted color image pixels into image signals for red, green and blue colors; and detecting brightness for said inputted color image pixels.

15. An image processing apparatus for converting an inputted color image comprising a plurality of pixels to a 2-color image comprising a black color and a specified color comprising:

a color determinator for determining whether an object pixel is for a specified color or not;

a black and white determinator for determining whether said object pixel is for white or black;

a converter coupled to said color determinator and said black and white determinator for converting data for said object pixel to represent the specified color, black or white;

a matrix generator for arranging data representing converted input pixels of said color image, included said object pixel, into a matrix;

pattern matching means for comparing at least one portion of said matrix, which includes the converted data for said object pixel, with at least one stored reference pattern; and color displacement correction means for changing the object pixel data only if there is a pattern match, the changed object pixel data being converted to represent the specified color if the black and white determinator determined non color for said object pixel or to represent black if said color determinator determined the specified color for said object pixel.

16. An image processing apparatus as recited in claim 15, further comprising:

a color separator for separating said inputted color image into image signals for red, green and blue, said color separator being coupled to said color determinator; and a brightness detector, coupled to receive said inputted color image, for detecting brightness of said color image.

* * * * *